May 19, 1936. P. A. JOHNSON 2,041,415
GROUND KEY VALVE
Filed Aug. 16, 1934
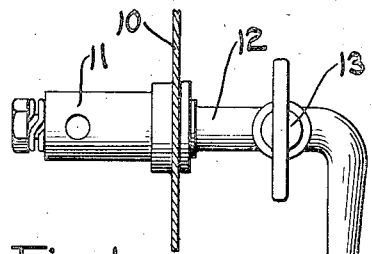
Fig. 1.
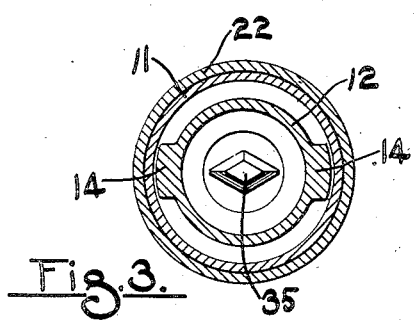
Fig. 3.
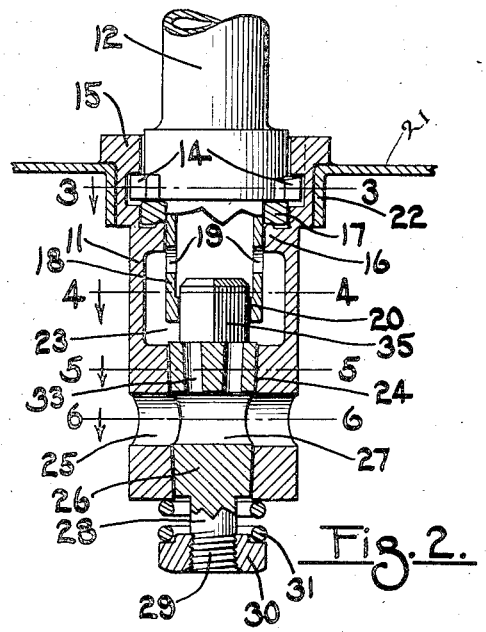
Fig. 2.
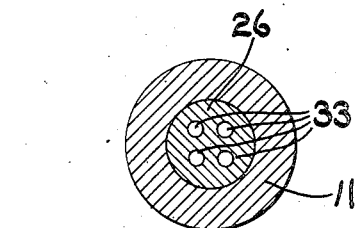
Fig. 4.
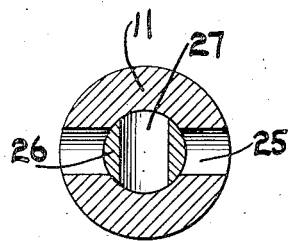
Fig. 6.
Fig. 5.
Inventor
Paul A. Johnson
By Liverance &
Van Antwerp
Attorneys Patented May 19, 1936

2,041,415

UNITED STATES PATENT OFFICE 2,041,415

GROUND KEY VALVE

Paul A. Johnson, Grand Haven, Mich.

Application August 16, 1934, Serial No. 740,077

1 Claim. (Cl. 284—14)

This invention relates to a beer valve.

As is set forth in my companion application, Serial No. 740,076, filed August 16, 1934, valves of the Golden Gate type are utilized in connection with the manufacture and sale of beer and it is one of the primary objects of this invention to provide a very efficient and yet economical beer valve of this character.

One feature of this invention lies in the fact that no rubber or fabric or molded composition is utilized, each of these materials being more or less subject to the chemical action of the beer whereby the parts themselves are subject to deterioration.

Another feature of my invention resides in the utilization of a plurality of relatively small holes or passageways whereby the beer flows in a more even stream. Along this same line is the further advantage that the beer can flow into the plug member of the valve from both ends thereof and then upwardly through the plurality of passages. Thus, as both ends of the port through the plug are operated at the same time it will be appreciated that they can be made correspondingly small and this is obviously an advantage.

Yet another advantage resides in the fact that the elimination of rubber makes for a better valve because in valves utilizing rubber or the like, the rubber is exposed to the atmosphere and thus deteriorates whereas in applicant's device only metal parts are used. Furthermore, when rubber is used the rubber oftentimes enlarges and enters into the adjacent ports of the valve and particles of rubber are sheared off and enter the beer as the valve is opened and closed.

Still another advantage of primary importance gained by my construction is that the connection around the central threaded stream of the valve need not be fluid tight. In other beer valves this has been an objection because it was necessary to absolutely prevent any leakage of the beer around the central bolt thereof.

Further advantages will become apparent as the description proceeds.

In the drawing:—

Fig. 1 is a view showing my improved valve and a tap inserted in the end of a barrel.

Fig. 2 is a view in cross section through my improved valve.

Figs. 3, 4, 5 and 6 are sectional views taken along corresponding sectional lines as shown in Fig. 2.

Like reference numerals refer to like parts throughout the several views.

In Fig. 1, numeral 10 indicates the end of the barrel which has the body portion 11 of my improved valve welded or pressed thereinto and a tap 12, having a valve 13, is detachably connected into the upper portion of my improved valve 11.

Referring now to Fig. 2, it will be seen that the tap 12 has extensions 14, see also Fig. 3, which fit underneath the boss 15. The boss 15 is cut away at two oppositely spaced points to provide slots for the entry of the extensions 14. After these extensions 14 have been entered through these slots, not shown, the tap 12 is partially rotated and the extensions 14 cam against the underside of the boss 15 and tight engagement is caused between the end of the tap 12 and an annular portion 16 formed interiorly of the body 11. A compressible washer 17 is inserted above the annular portion 16 and seals the joint against leakage.

The tap member is continued downwardly in the shape of a cylindrical tube 18, having lateral outlet holes 19 and a diamond shaped recess 20 in its bottom wall, the purpose of this diamond shaped recess to be described later.

In Fig. 2, numeral 21 indicates the side of a steel barrel which has an inturned flange 22 and the body portion 11 of my valve is fastened securely thereto. It is to be understood that the valve can be applied either to the end or side of the barrel or elsewhere if desired.

The body portion 11 is continued downwardly and has a passageway 23 extending entirely therethrough, this passageway being tapered as indicated at 24. A port 25 extends laterally through the body 11 as is clearly shown in Fig. 2.

A plug member 26, having an opening 27 which may be placed in alinement with the ports 25, see Fig. 2, or crosswise thereto, see Fig. 6, is revolubly mounted in the tapered portion 24.

A stem 28, threaded at 29, receives the nut 30 and a spring 31, interposed between the nut and the body member 11, pulls the plug 26 downwardly into snug engagement and tight operative position.

The plug 26 has four small openings 33, see Figs. 2 and 5, extending upwardly therethrough and these provide for the passage of beer upwardly. The small openings 33 terminate adjacent a diamond shaped projection 35. The projection 35 is slidably received within the diamond shaped recess 20 previously mentioned and when the tap member 12 is inserted, as previously described, and then rotated, the engagement of the projection 35 in the recess 20 causes the valve to be moved to open position as clearly shown in Fig. 2 and thus the beer may flow through the valve.

The invention is defined in the appended claim and is to be considered comprehensive of all forms of structure coming within its scope.

I claim:

A valve for beer barrels comprising a body having a passageway therethrough, said passageway being of tapered shape near one end, the taper being toward the closed end of body whereby the passageway is smallest adjacent the said end, said body having a straight port extending entirely therethrough and crossing the tapered shaped portion of the passageway at right angles thereto, a plug, having a straight opening therethrough, revolubly seated in the tapered part of the passageway, means for holding the plug tightly in its seated position, a relatively long projection of diamond cross sectional shape rigidly formed upon the top of the plug and extending upwardly into said passageway whereby the plug may be turned, thereby, said plug having a plurality of passages extending downwardly therethrough to connect with the opening through the plug whereby the beer may flow from the plug opening and then upwardly through the plurality of passages into the said passageway, said plurality of passages being located immediately adjacent the said projection and said relatively long projection being of sufficient length to have a space between the means for turning the projection and the top of the plug whereby a predetermined flow of liquid is assured.

PAUL A. JOHNSON.